United States Patent [19]

O'Leary

[11] Patent Number: 4,648,043

[45] Date of Patent: Mar. 3, 1987

[54] COMPUTERIZED SYSTEM FOR FEEDING CHEMICALS INTO WATER TREATMENT SYSTEM

[75] Inventor: Richard P. O'Leary, Wayne, Pa.

[73] Assignee: Betz Laboratories, Inc., Trevose, Pa.

[21] Appl. No.: 607,368

[22] Filed: May 7, 1984

[51] Int. Cl.⁴ .................... G05D 11/08; G05D 11/13; G06F 15/46

[52] U.S. Cl. .................................. 364/510; 364/502; 137/93

[58] Field of Search ............................ 137/93, 101.11; 364/510, 502

[56] References Cited

U.S. PATENT DOCUMENTS

| | | | |
|---|---|---|---|
| 3,094,133 | 6/1983 | Treanor | 137/101.11 |
| 3,238,128 | 3/1966 | Gustafson | 210/709 |
| 3,292,650 | 12/1966 | Bird et al. | 137/93 |
| 3,578,005 | 5/1971 | Jurion et al. | 137/93 |
| 3,592,212 | 7/1971 | Schleimer et al. | 137/93 |
| 3,605,775 | 9/1971 | Zaander | 364/502 |
| 3,612,087 | 10/1971 | Roland | 137/93 |
| 3,628,555 | 12/1971 | Nagano et al. | 137/93 |
| 3,690,340 | 9/1972 | Sipin | 137/93 |
| 3,754,741 | 8/1973 | Whitehurst et al. | 261/151 |
| 3,800,288 | 3/1974 | Russell et al. | 340/172.5 |
| 4,091,834 | 5/1978 | Frigate | 137/93 |
| 4,181,951 | 1/1980 | Bocke | 364/502 |
| 4,202,760 | 5/1980 | Storey et al. | 137/101.11 |
| 4,273,146 | 6/1981 | Johnson | 137/93 |
| 4,315,518 | 2/1982 | Sawyer | 137/93 |
| 4,414,193 | 11/1983 | Fredette et al. | 364/502 |
| 4,477,329 | 10/1984 | Rogers et al. | 137/93 |
| 4,538,222 | 8/1985 | Crain et al. | 364/502 |

Primary Examiner—Errol A. Krass
Assistant Examiner—Danielle B. Laibowitz
Attorney, Agent, or Firm—Caesar, Rivise, Bernstein, Cohen & Pokotilow, Ltd.

[57] ABSTRACT

A computerized chemical application system for a water treatment system. The water treatment system includes a main header conduit through which water flows. Connected in shunt with the main header is a chemical introduction header of smaller diameter and a lower flow rate than the main header. A computer control is provided to sense the conductivity of a reference water flowing through the chemical introduction header. Injection means are provided to introduce a water treatment liquid into the chemical introduction header and to mix it thoroughly with the water flowing therein. The conductivity of the mixture is sensed, and based upon the differential conductivity and values relating conductivity to concentration for the water treatment liquid (which values are stored within the computer control) the amount of the water treatment liquid introduced is precisely controlled.

29 Claims, 3 Drawing Figures

FIG. 1B

COMPUTERIZED SYSTEM FOR FEEDING CHEMICALS INTO WATER TREATMENT SYSTEM

BACKGROUND OF THE INVENTION

This invention relates generally to water treatment systems and more particularly to systems for automatically controlling the introduction of chemicals therein.

Various systems used in the control of application of chemicals to water treatment systems are commercially available. While such systems are suitable for their general purposes, they nevertheless suffer from various disadvantages such as the lack of accuracy, slow response time, etc. Moreover prior art systems have failed to take advantage of the computer revolution to effect the computerized control of the entire water treatment process.

Examples of prior art water treatment systems or chemical application means therefore are found in the U.S. Pat. Nos. 3,094,133 (Treanor), 3,292,650 (Bird et al), 3,592,212 (Schleimer) and 3,754,741 (Whitehurst et al).

OBJECTS OF THE INVENTION

It is the general object of the instant invention to provide a system for applying chemicals to water treatment systems which overcomes the disadvantages of the prior art.

It is a further object of the instant invention to provide an automated system for controlling the application of chemicals to a water treatment system.

It is still a further object of the instant invention to provide a computerized control system for water treatment systems.

It is yet a further object of the instant invention to provide a system for effecting accurate mixing of any two fluids in response to sensed parameters relating thereto.

SUMMARY OF THE INVENTION

These and other objects of the instant invention are achieved by providing in a system having a main line carrying a first fluid therethrough, control means, and means for selectively introducing a second fluid into said main line. The system comprises a shunt line of substantially lower flow rate than the main line and which is arranged to receive a reference fluid flowing therethrough and having known characteristics. The shunt line includes injecting means for introducing the second fluid into the line and for mixing the second fluid with the fluid flowing through the shunt line. The shunt line also includes first sensing means located upstream of the injecting means for measuring a steady state parameter of the fluid flowing thereby and second sensing means located downstream of the injecting means for measuring the steady state parameter of the fluid flowing thereby. The control means is coupled to the injecting means for controlling the introduction of the second fluid into the shunt line in response to the sensed parameters.

In accordance with one aspect of the instant invention the main line carries water from a water treatment system, which water serves as the first fluid. The shunt line comprises a chemical introduction header line into which a reference liquid, such as city water, is introduced. At least one water treatment chemical, in liquid form, serves as the second fluid and is introduced into the shunt line. The control means is computer-based and controls the introduction of the chemical into the shunt line based upon conductivity as sensed by the sensing means. To that end the computer includes data in the form of a look-up table correlating conductivity to chemical concentration.

DESCRIPTION OF THE DRAWINGS

Other objects and many of attendant advantages of this invention will be readily appreciated as the same becomes better understood by reference to the following detailed description when considered in connection with the accompanying drawings wherein:

FIG. 1, consisting of FIG. 1A

DETAILED DESCRIPTION OF PREFERRED EMBODIMENT

Referring now to various figures of the drawing wherein like reference characters refer to like parts, there is shown at 20 in FIG. 1 a computerized chemical feed control system for use in a conventional cooling water tower system 22. While the system 20 of the subject invention is shown in a cooling tower system 22 it must be understood that the subject invention can be used in any water treatment or conditioning system. Moreover, as will be appreciated by those skilled in the art, the subject invention can be used for effecting the accurate and precise mixing of any two or more fluids based on monitored parameters thereof.

Before describing the details of the computerized system 20 a general description of the cooling tower system 22 is in order. Thus, as can be seen, the cooling tower system is conventional and basically comprises a cooling tower 24 connected in series in a main water carrying header or pipe. The header is a relatively large diameter, e.g., 8" (20.32 cm), pipe and consists of various serially connected sections, to be described hereinafter, and used to circulate water from the tower through a conventional heat exchanger and back to the tower. Thus, the outlet of the tower is connected via a main header section 28 to a condenser pump 30. The output of the pump 30 is connected, via a main header section 32, to the heat exchanger 34. In particular the header section 32 is connected as the input to the condenser 36 of the heat exchanger. The heat exchanger also includes a chiller 38 which is connected in a closed loop with associated components (not shown) enabling water to be passed therethrough. The outlet of the condenser is connected to header section 26. This latter header section is connected back to the tower inlet.

As will be appreciated by those skilled in the art the heat exchanger 34 includes Freon TM gas therein. The condenser 36 picks up heat from the chilled water loop of the chiller 38. The heat picked up is transferred by the condenser to the water flowing through the main header. Thus, water is carried back to the cooling tower by header section 26, where it is cooled by atmospheric evaporation. The cooled water is carried by section 28 to the pump 30 for passage back to the condenser.

Since evaporation takes place in the cooling tower an increase of solids develops in the tower water as it is circulated through the system. In order to preclude excessive solids from building up, the cooling tower system includes a means to enable water to be drained from the system periodically. Such means includes a bleed valve line 40 having an automatic bleed valve 42, a manual value 44, a strainer 46 and a flow meter 48. The draining action is commonly referred to as "blow-down" and is accomplished when the conductivity of the tower water reaches a predetermined "set point" value. In particular, as is conventional in the prior art, a conductivity controller is utilized to monitor the conductivity of the tower water. That controller is coupled to the automatic bleed valve 42 via control line 70, whereupon the automatic bleed valve is opened when the tower water conductivity reaches a first predetermined set point and is closed when it reached a second predetermined (lower) trip point.

In order to replace the water that is dumped during each blow-down operation and that which leaves the system by evaporation, "make-up" water is introduced into the cooling tower. The make-up water is introduced via make-up water conduit 50 (FIG. 1A) which is connected to a source or sources of make-up water. That source can consist of city water, lake water, well water, etc. The make-up water conduit 50 includes a float valve (not shown) in fluid communication therewith and located within the tower. A float 52 is located within the tower and is associated with and controls the operation of the float valve. The float is utilized to determine when sufficient amount of make-up water has been introduced into the cooling tower to make-up for that water lost during blow-down and evaporation.

In my copending U.S. patent application Ser. Nos. 451,356 and 452,672, filed on Dec. 20, 1982 and Dec. 23, 1982, entitled Indexing Controller System and Method of Automatic Control of Cooling Water Tower Systems, and Indexing Controller for Cooling Water Tower Systems, respectively, and whose disclosures are incorporated by reference herein, there is disclosed and claimed an indexing controller which overcomes disadvantages of prior art controllers. Thus, the indexing controller of my aforementioned patent applications includes probes to monitor the electrical conductivity of the water in the cooling tower. When the indexing controller determines that the conductivity of the cooling water in the tower has reached a predetermined maximum value to maintain a desired Langelier's number, the controller causes the automatic bleed valve to open to effect blow-down of the system. The dropping water level in the tower during blow-down is sensed by the float 52 and its associated valve is opened to introduce replacement or make-up water from conduit 50. In order to replace chemicals which are lost during the blow-down operation the replacement chemicals are introduced into the system via a shunt or chemical introduction line.

The conductivity of the make-up water introduced into the tower is sensed by the indexing controller and a signal indicative thereof is provided to the controller. The controller utilizes that signal to calculate an adjusted trip point for the system. When the conductivity of the tower water drops below the adjusted trip point the controller provides signals to the automatic bleed valve to stop the blow-down operation. In addition the controller causes the pumps which are utilized to introduce replacement chemicals into the system to stop operation. When sufficient make-up water has been introduced into the tower to compensate for the water dumped the float 52 is raised to its normal position and its associated float valve closed to prevent further introduction of make-up water (except for that which is necessary to replace water lost through evaporation). The cooling tower system is now ready to recirculate the cooling water therethrough until the conductivity of the water in the cooling tower reaches the adjusted trip point so that a new blow-down cycle occurs.

The use of an indexing controller, such as set forth in my aforenoted copending application enables the trip point, that is the maximum concentration for cooling tower water, to be adjusted to reflect changes in conductivity of the make-up water to maintain a desired predetermined Langelier's Index number(s). Thus, even if the make-up water varies substantially in conductivity, as could occur if the make-up water is switched from lake water to well water, etc., the desired Langelier's index for the water in the system can be maintained to prevent scaling or corrosion, while maximizing the number of cycles that the cooling water can be recirculated through the system before blow-down.

The computerized control system 20 of the subject invention not only effectuates the ends of the teachings of my aforenoted patent application, but also enables the automatic precise feeding of chemicals, acids, biocides, and other liquids, into the system as well as performing other functions, to be described later.

Figure 1A:
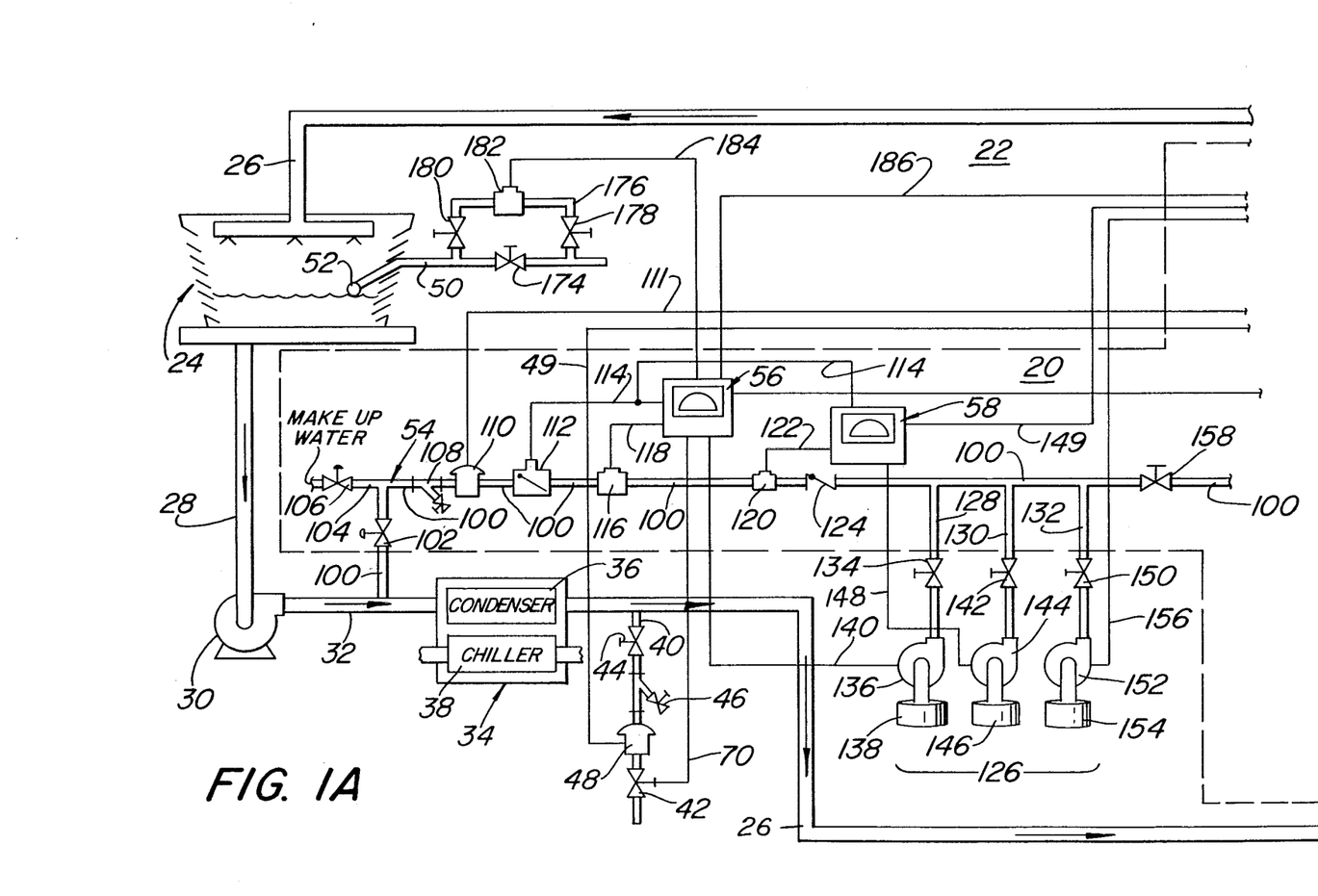
Figure 1B:
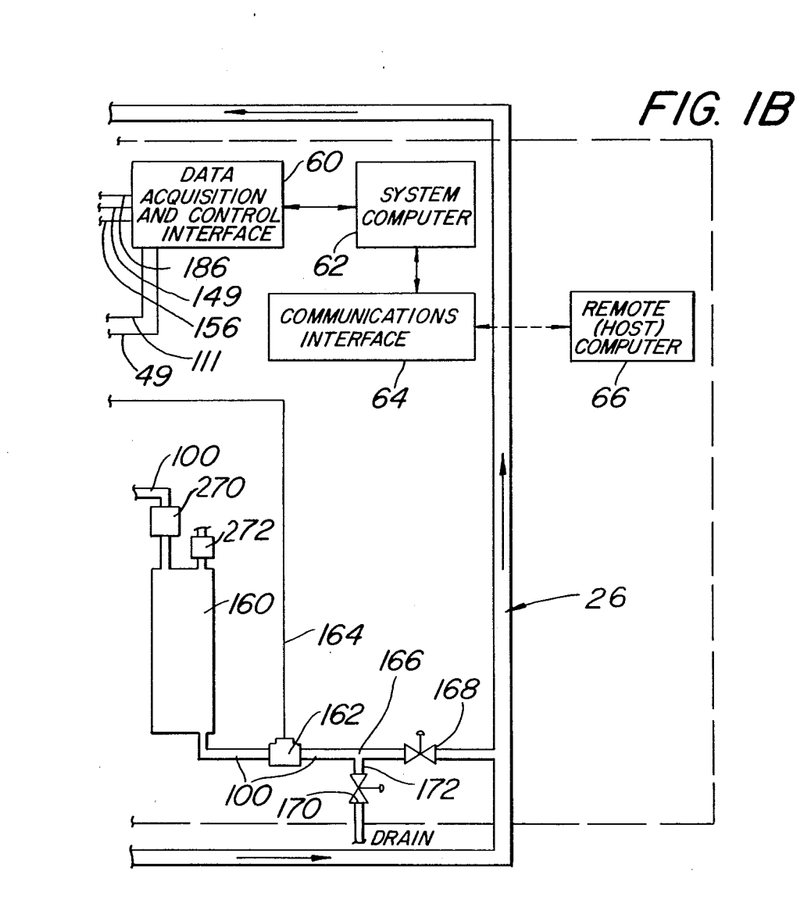
FIG. 1B is a schematic diagram of a water treatment system utilizing the control system of the subject invention.

As can be seen in FIGS. 1A and 1B the computerized chemical feed system 20 basically comprises a chemical introduction header 54 which consists of various sensors, meters, probes and valves (all to be described later) and into which various water treatment chemicals, acids and biocides, etc. is arranged to be injected under computer control. The system 20 also includes an Indexing controller 56 and a pH Controller 58. The Indexing Controller is connected to various conductivity sensing probes (to be described later) and to a Data Acquisition and Control Interface Unit 60. The pH Controller is connected to a pH sensing probe (also to be described later) and to the Data Acquisition and Control Interface Unit 60. The system 20 also includes a system computer 62 which is arranged to be located at the facility or plant where the cooling tower is located. The system computer can be used to control operation of various water treatment operations (e.g., cooling towers, boilers, etc.) at the facility via the use of plural Data Acquisition and Control Interface Units 60. Moreover, the system (on-site) computer 62 is connected to a Communications Interface 64 which serves as means for communicating with a remote or host computer 66. The remote computer 66 is located at a remote site from the facility at which the system 20 is located and serves as a central control for any number of systems 20. Thus, in accordance with the preferred embodiment of the instant invention the remote computer 66 is arranged to be connected to a large number systems 20 located at various locations throughout the country.

In accordance with one preferred aspect of this invention the chemical introduction header consists of a low flow rate, e.g. 4 gallons per minute, small diameter, e.g., $\frac{3}{4}''$ (1.9 cm), conduit or pipe 100 and which is connected via valves (to be described later) to the main header across the refrigeration unit 34. As will be appreciated from the following description the chemical introduction header 54 is unlike conventional chemical introduction headers in that it includes various components making up the system 20 which automate the chemical, acid, and biocide feed operations under control of the system computer 62 and/or the remote host computer 66. Thus, chemical introduction header 54 is connected at its upstream end to the main header 32 section between the pump 30 and the heat exchanger 34 via a first solenoid valve 102. Connected downstream of the valve 102 in conduit 100 is a T-coupling 104. A second solenoid valve 106 is connected between a source of make-up water, e.g., city water, (not shown), and a second leg of the T-coupling 104. The valves 102 and 106 are arranged so that when valve 102 is closed and the valve 106 is opened make-up water flows into the chemical feed header 54. Conversely, when valve 102 is open and valve 106 is closed cooling tower water from the main header section 32 is enabled to flow into the chemical feed header.

A conventional strainer 108 is located in the conduit 100 downstream of the T-coupling 104. The strainer is arranged to enable unwanted solids to be removed from the chemical feed header, when desired. A conventional flow meter 110 is connected in the conduit 100 downstream of the strainer 108. The flow meter is electrically connected, via conductors 111, to the Data Acquisition and Control Interface Unit 60 to provide signals thereto and which are indicative of the rate of flow of liquid through the header 54. A conventional flow switch 112 is connected in the conduit 100 downstream of the meter 110. The flow switch is electrically connected, via conductors 114, to the Indexing Controller 56 and the pH Controller 58. The flow switch is arranged to provide an electrical signal(s) to those controllers in the event that the flow of water through the header ceases in order to preclude introduction of chemicals, acid or biocide into a "dry" line 54. A first conventional conductivity sensing probe 116 is located in the conduit 100 downstream of the flow switch 112. The probe 116 is connected via electrical conductors 118 to the Indexing Controller 56. A conventional pH sensing 120 is located in the conduit 100 downstream of the conductivity probe 116. The pH probe 120 is connected via electrical conductors 122 to the pH Controller 58.

A conventional check valve 124 is connected in conduit 100 downstream of probe 120 and serves to prevent any chemical(s), acid or biocide which is introduced into the header from flowing upstream.

The chemical(s), acid and biocide are introduced or injected into the chemical header 54 downstream of the check valve 124 by chemical injection means generally designated by the reference numeral 126. Such injection means comprises various branch lines in fluid communication with the conduit 100. Each branch line is arranged to provide a respective water treatment liquid, e.g., chemical(s), acid or biocide, into the header 54. Thus, in the embodiment shown in FIG. 1A the injection means 126 consists of a chemical feed branch line 128, a acid feed branch line 130 and a biocide feed branch line 132. The chemical feed branch line is in fluid communication with the conduit 100 and includes a conventional valve 134 located in the branch line. Chemicals, in liquid form, for treating the system water are introduced or injected into the line 128 and hence into the header 54 via conventional pulsating feed pump 136 when the valve 134 is open. The chemicals are pumped from a chemical supply tank 138. Control of the pump 136 is effected, via electrical connectors 140, from the Indexing Controller 56.

It must be pointed out at this juncture that any number of chemical feed lines (with associated pumps, valves and tanks) may be utilized to supply the chemical feed header 54. Thus, a single chemical feed line 128 shown herein is merely exemplary and in the interest of drawing simplicity.

The acid feed branch line 130 serves as the means for injecting acid into the chemical feed header to adjust the pH of the water in the system. Thus, the acid feed line 130 is constructed in a similar manner to the chemical feed line 128 and basically comprises a conventional valve 142, a conventional pulsating pump 144 and an acid holding tank 146. The pump 146 is electrically connected, via connectors 148, from the pH controller 58. Thus, when valve 142 is open and pump 144 actuated acid is injected into branch line 130 and hence into the chemical feed header 54.

The biocide branch feed line 132 serves as the means for providing a liquid biocide into the chemical feed header. The biocide serves to preclude the build-up of biological deposits, e.g., slime, in the system. Thus, the biocide branch feed line is constructed in a similar manner to chemical feed line and acid feed lines 128 and 130, respectively. To that end the biocide 132 includes a conventional valve 150, a conventional pulsating pump 152 and a biocide storage tank 154. The pump 152 is electrically connected to the Data Acquisition and Control Interface Unit 60 via electrical conductor(s) 156.

As can be seen in FIG. 1A a conventional valve 158 is located in the conduit 100 downstream of the chemical introduction lines 128–132. This valve enable(s) the remainder of the header 54 downstream of the valve to be isolated from the portion of the header upstream of the valve in the interest of system mainten- ance.

As is known by those skilled in the art water treatment chemicals, acids and biocides used today are provided in concentrated liquid form into the water system. The introduction of such liquids into the water system is almost invariably accomplished by pulsating type pumps inasmuch as the volume of the liquid chemicals to be added to the system is very small as compared to the volume of the system itself. Thus, to utilize continuous feed centrifugal pumps for the liquid chemical introduction is not commercially viable, since such usage would require either very expensive low flow rate pumps or large tanks for storage of very dilute chemicals. As is also known while pulsating pumps are effective for introducing small amounts or spurts of liquid chemicals into the chemical feed header, the chemicals do not become well mixed with water therein. Rather each chemical when injected in a spurt tends to remain together, that is stays together as a agglomeration or mass flowing down the header.

In order to insure that the chemicals introduced by the pulsating pumps into the chemical feed header 54 are adequately mixed with the water in the header, the system 20 includes a mixing device 160 connected in the conduit 100 downstream of the valve 158.

Figure 2:
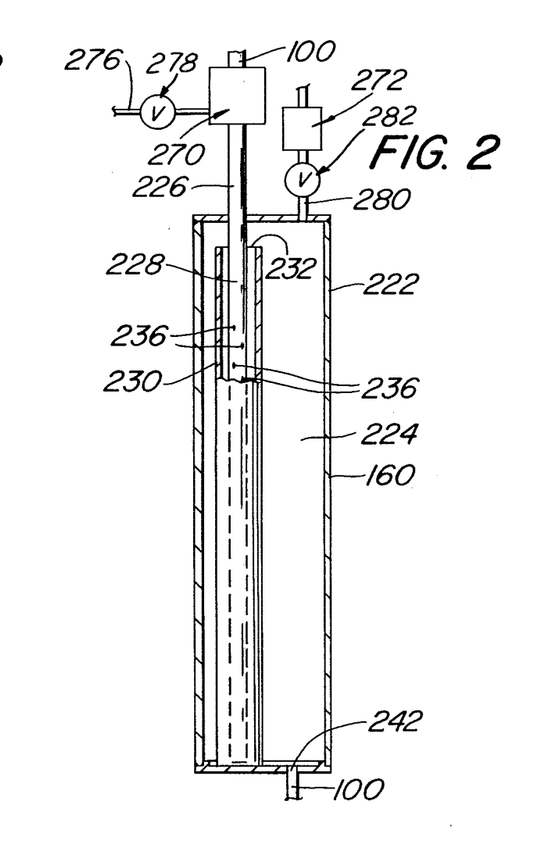
FIG. 2 is a side elevational view, partially in section of a mixing device shown schematically in FIG. 1.

The mixing device 160 can consist of any device sufficient to provide uniform mixture of the chemicals and the water. In accordance with the preferred embodiment of the instant invention the mixing device 160 is constructed in accordance with the teachings of my co-pending U.S. patent application Ser. No. 607,494 filed on May 7, 1986, entitled Liquid Mixing Device now U.S. Pat. No. 4,533,123 issued Aug. 6, 1986, and whose disclosure is incorporated by reference herein. The basic construction of that device is shown in FIG. 2 herein and will be described later.

As can be seen in FIG. 1B a second conductivity sensing probe 162 is connected in the conduit 100 downstream of the mixing device 160. The probe 162 is also of conventional construction and is connected via electrical conductors 164 to the Indexing Conroller 56. A second T-coupling 166 is connected in the conduit 100 downstream of the probe 162. A third solenoid valve 168 is connected in the conduit 100 downstream of the T-coupling 166. The outlet of valve 168 is connected to conduit section 100 which is in fluid communication with the main header section 26.

The valve 168 serves to connect the chemical feed header 54 to the main header downstream of the heat exchanger. A fourth solenoid valve 170 is connected in a drain-line 172. The drainline is connected to one end of the T-coupling 166 and is arranged to drain liquids from the chemical feed header when valve 170 is open. When valve 170 is closed and valve 168 is open the liquid flowing through the chemical feed header 54 flows back into the main header 26 for passage through the cooling tower system 22.

Each of the solenoid valves 102, 106, 168 and 170 is a conventional electrically operative valve and is electrically connected via means (not shown) to the Data Acquisition and Control Interface Unit 60. The unit 60, under the control of the system computer 62 causes the valves 102, 106, 168 and 170 to be opened or closed, as required for system operation. The Data Acquisition and Control Interface Unit 60 itself includes a microprocessor and analog multiplexers to continually monitor the input signals from the sensors, meters, etc. connected thereto. Analog input signals from the sensors and meters are converted into 8 bit digital signals for transmittal to computer 62. The Unit 60 also includes means for providing analog digital signals to control the pumps, solenoid valves, etc.

As mentioned earlier make-up water for the cooling tower system is provided via conduit 50 and associated float valve 52 from a source of make-up water, e.g., the city water. In particular in the exemplary system shown herein the make-up water line 50 includes a conventional valve 174 therein. A shunt-line 176 extends around valve 174 in line 50. The shunt-line 176 includes a first conventional valve 178 connected in the upstream end of the shunt-line 176 and a second conventional valve 180 in the downstream end of the shunt-line. A third conventional conductivity sensing probe 182 is connected in the shunt-line between the valves 178 and 180. The probe 182 is connected via connectors 184 to the Indexing Controller 56.

When the valve 174 is open and the valves 178 and 180 are closed the make-up water flows through conduit 50 into the cooling tower under the control of the float 52. When it is desired to monitor the conductivity of the make-up water (for reasons to be described later) the valve 174 is closed and valves 178 and 180 are opened, whereupon the make-up water flows through the shuntline 176 past probe 182. The probe 182 provides a signal indicative of the conductivity of the make-up water on line 184 to the indexing controller. This signal is coupled by the Indexing Controller to the Data Acquisition and Control Interface Unit 60 via electrical conductors 186. The conductors 186 serve as a bidirectional communications bus between the Indexing Controller and the Data Acquisition and Control Interface Unit 60. The three conductivity sensing probes 116, 162 and 182 are arranged to provide respective electrical signals indicative of the conductivity of the liquid flowing thereby. These signals are coupled via their respective electrical conductors through the Indexing Controller 56 and to the Data Acquisition and Control Unit 60. The Data Acquisition and Control Unit provides the means to automatically measure various process variables near their sources, and transmit the resulting measurements to the system computer 62 for processing and, in turn, receive outgoing process-control commands from the system computer.

In accordance with one preferred aspect of this invention the system 20 consists of a heirarchy of distributed processing and control units to take advantage of modern, high-functionality, low cost micro-processors, together with distributed network communication techniques. In particular the system is structured so that routine, low-level functions such as acquiring data and activating control devices are handled by their remote units, e.g., probes, solenoid valves, etc. located at the various water treatment sites of a medium size industrial or institutional facility. Data and status reports are passed up to the system computer 62 for processing and interpretation. The computer 62, in turn, sends instructions to the remote units to initiate control action or return additional data or status information. Moreover the computer 62 prepares operating summaries and reports for plant management and sends this data to the remote host computer 66 for record storage and trend analysis.

The addition of a chemical, such as a water treatment product, adds a known amount of conductivity (micromhos) per part per million of chemical treatment. Cooling tower systems, like that shown herein offer a difficult challenge insofar as the control of chemical treatment on the basis of sensed conductivity because of various factors, such as evaporation, blow-down, and windage loss. Moreover, variations or fluctuations in make-up water had made conventional conductivity controllers ineffective in maintaining proper chemical concentrations and water treatment levels in cooling water systems prior to the invention set forth in my aforenoted copending U.S. patent applications Ser. Nos. 451,356 and 452,672. Thus, that indexing controller allows the conductivity set point to be reset so that the desirable saturation index can be maintained irrespective of variations in conductivity of the make-up water supplies. Notwithstanding the development of that indexing controller, the automatic controlled application of water treatment chemicals based on conductivity has heretofore not proved feasible for several reasons, e.g., the concentration of water treatment products in conventional total treatment ranges develop a conductivity which is too low to be used for direct sensing and control.

One aspect of the subject system enables a greater increase in conductivity per treatment level, thereby making conductivity an acceptable means of controlling chemical concentration. Moreover the system 20 utilizes a novel technique and apparatus for enabling one to accurately mix plural fluids together based upon sensed parameters, e.g., conductivity. In particular in the embodiment shown herein the conductivity of a known liquid stream, e.g., make-up water, is determined. The liquid chemicals to be introduced into the water for treating the water are injected into the known stream. The conductivity of the mixed water and chemicals is determined after equilibrium occurs to provide an indication of the differential conductivity, that is the conductivity of the liquid before and after the introduction of the chemicals. Based on known empirically derived data correlating conductivity to chemical concentration, the concentration (e.g., poundage) of chemicals introduced into the stream is readily determined. With the flow rate of the water in the stream known the amount of chemicals fed into the stream per minute is readily calculated. This information is then used to control the duration of time that the pulsating feed pump must be on to introduce the desired amount of chemical into the system, e.g., the amount of chemicals lost during blow-down.

The system 20 utilizes the computer 62 to compute the chemical requirements for the system, the blow-down time, the evaporation time, and the appropriate chemical feed time to maintain an existing system. As will be described in detail hereinafter the computer also monitors the conductivity of the make-up water and the tower water (the water in the main header). Upon the activation of the blow-down valve under the control of the Indexing Controller 56 the conductivity limit for the system is recorded. The computer then monitors the blow-down valve to determine the time that blow-down has occurred. In addition the computer calculates the volume (e.g., gallons) of tower water dumped during the blow-down operation and also calculates the weight (e.g., pounds) of chemicals lost during such dumping action. Under the control of the computer and the controller 56 the chemical feed pump 136 is activated. In particular system operation is as follows: During the circulation of water in the cooling tower system 22 evaporation occurs, thereby causing the increase of solids to develop in the system. The solenoid valves 102 and 168, under the control of the computer 62 and Data Acquisition and Interface Unit 60 are open at this time, whereas valves 106 and 170 are closed. Accordingly a portion of the cooling tower water is diverted from the main header section 32 into the chemical feed header 54. The indexing controller 56, via its probe 116, monitors the conductivity of the tower water passing thereby and provides signals indicative of the monitored conductivity, via lines 186, to the Data Acquisition and Control Interface Unit 60. That unit in turn provides appropriate signals to the system computer 62. When the conductivity sensed reaches a predetermined set point the computer 62 provides a signal through the unit 60 to the Indexing Controller 56. The later signal is provided via electrical conductor 70 to the automatic bleed valve 42 to cause the valve to open, thereby discharging or dumping tower water from the main header 32. The computer also establishes the time interval that the automatic bleed valve remains open. In this regard stored within the computer is data indicating the flow rate through the auto bleed valve 42. Blow-down continues until the conductivity probe 116 senses the desired set point for termination of blow-down. Based on the time sensed during which blow-down occurred and the flow rate through the automatic bleed valve, as sensed by the flow meter 48, the computer 62 calculates the amount of water and its proportional ratio of chemicals that were lost during the blow-down operation. The computer then operates in either one of two modes to restore the proper chemical balance in the system.

In the first mode the amount of chemicals to be added is calculated based on conductivity readings referenced to a liquid of known conductivity, e.g., make-up water. In the second mode the calculations are based on conductivity of the tower water used as a reference. Thus, in the first mode the computer provides signals to the Unit 60 to close solenoid valve 102, thereby precluding cooling tower water from entering in the chemical introduction header 54. At the same time the valve 106 is opened to permit make-up water to enter into the header 54. The flow rate of the make-up water flowing through the header and the conductivity thereof are determined by the meter 110 and probe 116, respectively. The respective signals indicative thereof are provided via electrical conduit 111 and electrical conduit 118 to the indexing controller 56 and the Data Acquisition Unit 60, respectively. The signal indicative of the conductivity is provided from controller 56 via bus 186 to the Data Acquisition Unit 60 and from there to the computer 62. In this mode the make-up water serves as a reference liquid of known conductivity and thus flows past the pH probe 120, the check valve, past all the chemical injection points, through the mixing device 160 and past conductivity probe 162.

At the time that valve 102 was closed and valve 106 opened by signals from unit 60 the valve 168 was closed and valve 170 was opened also by signals from unit 60. Accordingly, the make-up water flowing through the header 54 is not reintroduced into the main header but instead is drained from the header 54.

After a short predetermined period of time, e.g., 30 seconds, the computer signals the Indexing Controller, via the unit 60, to read and store the conductivity readings sensed by probes 116 and 162. When both readings are the same (as they will be upon system equilibrium) the conductivity readings are stored in the computer and the computer provides a signal via the unit 60 and the Indexing Controller 56 to the chemical feed pump 136. This action causes the pump to start pumping the liquid water treatment chemical from its tank 138 via open valve 134 and feedline 128 into the chemical feed header 54.

Inasmuch as the subject invention controls the addition of chemicals based on sensed conductivity of the chemicals introduced it is of utmost importance that the conductivity readings after introduction of the chemicals be made after the chemicals are homogenously mixed with the system water. Thus, the chemical introduced in the header is thereafter mixed with the water flowing through the header 54 in the mixing device 160 so that a uniform mixture exits the device 160 and flows past probe 162. The probe 162 senses the conductivity of the liquid (the homogenous chemical and water mixture) flowing thereby and provides a signal indicative thereof to the Indexing Controller via line 164. This signal is coupled back to the computer via the unit 60. When the conductivity as sensed by probe 162 reaches a maximum and stable (steady state) value, a system computer 62 calculates the feed rate of the chemicals being injected into the system per minute. This calculation is accomplished via look-up table data stored in the system computer and which data is based on the linear relationship between conductivity and chemical concentration for each chemical being added into the system. In addition the flow rate of the water through the chemical introduction header is also known by the system computer 62 from the signals received from the flow meter 110.

After determining the number of pounds of chemicals added per minute by the feed pump 136 the computer 62 initiates the closing of the make-up water valve 106, the opening of shunt valve 102, the closing of drain valve 170 and the opening of shunt valve 168. This action allows the contents of the chemical feed header to go into the main header to introduce the mixture of chemical and water therein. Also stored within the systems computer is the volume of the chemical feed header 54.

With that data the computer calculates the time necessary for the chemical feed pump to remain on (pumping) to inject the desired amount of chemicals to replace that lost during blow-down.

The second mode of operation for the system after blowdown has been completed is accomplished by the computer opening valves 102 and 168 while closing valves 106 and 170. This allows the tower water flowing through the main header 32 to branch off into the chemical introduction header 54. Thus, the tower water acts at the reference liquid (such operation is viable inasmuch as tower water conductivity is stable enough over the short period of time during which conductivity is sensed to allow its use as a reference). When the conductivity as sensed by the probes 116 and 162 in the chemical introduction header is the same, the computer 62 provides appropriate signals to the Data Acquisition and Control Interface Unit 60, which in turn provides those signals via the indexing controller 56 to the chemical feed pump 136, whereupon the pump commences operating. The computer records the time of the initiation of operation of the pump and monitors the conductivity of probe 162 via controller 56 and Unit 60. When the conductivity sensed reaches a steady state (maximum) level the computer 62 then calculates the chemical feed concentration of the liquid flowing through the header based on the flow rate readings taken by meter 110. The computer compares this value against the calculated lost chemicals, the latter value being obtained from the bleed meter 48 flow rate and the time that the valve was open during blow-down. The computer provides a signal to turn the chemical feed pump off when the required amount of chemicals have been introduced into the feed line. The system remains in this mode of operation until the next cycle requiring blow-down and chemical feed.

It must be pointed out at this juncture that other chemicals can be added to the system after the introduction of the first chemical as described heretofore. In such an operation the introduction of each successive chemical is accomplished using the same methodology as described above.

Control of the addition of acid via acid feed line 130 is accomplished in a similar manner to the introduction of chemicals by sensing the conductivity of the system's liquids, via the conductivity probe 162, Indexing Controller 56, Data Acquisition Unit 60 and Computer 62. The pH signals received via the pH probe 120 and pH controller 58 are transmitted to the Data Acquisition Unit 60 and computer 62 where lookup tables compare the existing pH reading against the desired control limit. The computer 62 then calculates the quantity of acid to bring the system 22 to the desired limit, at which time a signal is provided via computer 62 controller 58 and unit 60 to the pump 144 to turn it off.

As is known to those skilled in the art in conventional water tower systems it takes at least five circulations of the tower water through the system after application of acid thereto to get a homogenous mixture. Thus, with the use of conventional pH controllers the acid must be pumped slowly to permit proper mixing and to reach the desired system pH. By virtue of system hysteresis (i.e., the large amount of water in the system) by the time the pH controller reads the correct pH to turn the acid injecting pump off the system may have been overdosed with acid.

Using the teachings and system of the instant invention one can readily determine the appropriate amount of acid to be introduced and the pump providing the acid can be accurately controlled to ensure that it is on only for the precise time necessary to introduce that amount of acid. Such action is based on the recognition that there is a direct relationship between pounds of acid and pounds of M-Alkalinity. There is also a direct relationship between M-Alkalinity and pH. Thus, with the subject invention knowing the pounds of acid fed per minute enables the computer to calculate the exact poundage necessary to bring the pH to the control limit. Hence the computer predicts when to turn the acid pump off to satisfy the shut off point on the pH controller without overdosing the system.

Control of the biocide introduction is also accomplished under computer control via the Data Acquisition and Interface Unit 60 and can be accomplished periodically or on an "as needed" basis (as will be considered later).

During normal operation of the system 20 shown herein the computer 62 provides the control signals via the Data Acquisition and Control Interface Unit 60 to the Indexing controller 56, the pH Controller 58, as well as the various solenoid valves to automatically control the blow-down operation and the introduction of chemicals and acid into the system as required. In the event of a power failure or failure in the system computer 62 the indexing controller 56 switches into a back-up mode of operation. In the back-up mode the controller 56 operates as described in my aforementioned co-pending U.S. patent application Ser. Nos. 451,356 and 452,672. Moreover the Indexing Controller 56 also includes timing means which serves during back-up operation to reproportion the pump 136, via line 140, to the exact rate of chemical feed in proportion to the amount lost during blow-down.

Failure of the system computer or a power failure also causes the pH Controller 58 to operate in a back-up mode. It is in this mode that the pH controller controls the application of acid via the pump in a conventional manner.

The Data Acquisition and Control Interface Unit 60 may also include a CRT display and a printer associated therewith to provide a visual display and hard copy of various system conditions at the location of the unit, e.g., adjacent the cooling system, inasmuch as the plant system computer 62 may be at some remote location in the plant, e.g., in the offices.

In accordance with another feature of the subject invention the system 20 can determine if any of the conductivity sensing probes 116, 162 or 182 are fouled. In this regard in order to determine if all the probes are clean (not fouled) the valves 178 and 180 are opened and valve 174 is closed, all under control of the computer via the unit 60 so that the make-up water flowing to the cooling tower passes by probe 182. At the same time the valve 102 is closed and the make-up water valve 106 is opened and the valve 168 is closed and the drain valve 170 opened, all under computer control. The computer 62, via the Data Acquisition and Control Interface Unit 60 and the Indexing Controller 56 monitors the conductivity sensed by probes 116, 162 and 182. The conductivity as sensed by each probe is compared against the other probes to determine which, if any, of the probes is fouled. In this regard if all the probes are operating properly and not fouled they should all read the same conductivity once the contents of the mixing device 160 has been emptied of any introduced chemicals, i.e., after the make-up water has passed fully through the chemical introduction header and thus past probes 116 and 162. Thus, make-up water will flow past probes 182, 116 and 162. If all the probes are operating properly they will all provide the same conductivity reading. If, however, one probe provides a different reading than the other two, then each of the probes have to be checked against the others to determine which is not providing the correct reading. To accomplish that end the Indexing Controller 56 includes various relays (not shown) associated with the probes to drop off (disconnect) any two probes from the system at the same time. For example, under the control of the system computer the Data Acquisition and Control Interface Unit 60 provides signals to the relays in the Indexing Controller 56 and causes probes 116 and 182 to be isolated from the system. A reading is then taken by probe 162. This conductivity reading is stored by the computer. Probe 162 is then isolated and probe 116 is reconnected by the relays in the controller 56, whereupon the reading of probe 116 is taken and stored. Thereafter, probes 116 and 162 are isolated and probe 182 is reconnected by the relays in the controller 56 so that its reading can be taken and stored. The readings of all three probes are then compared against one another in the system computer to determine which, if any, of the probes is fouled. The system computer 62 also has stored therein the conductivity of the make-up water which is compared against the conductivity sensed by the probes in order to insure that all three probes are not in error and providing the same erroneous conductivity reading.

The Indexing Controller 56 also includes a bank of relays (not shown) which override the controlling mechanism so that the system computer 62 controls the operation of the chemical feed pumps during normal operation. Thus, in normal operation, the computer also performs the function of controlling blow-down irrespective of varying make-up water conductivity conditions. It is only upon a computer or power failure that the relays are activated to switch the Indexing Controller 56 to its back-up mode of operation. In a similar manner the pH controller also includes a bank of relays (not shown) which enable it to control acid feed in the event of a computer system failure. Thus, in normal operation both the indexing controller and the pH controller become nothing more than indicating meters routing signals to the system computer 62 indictative of measured parameters.

In order to effect the calibration of the Indexing Controller 56 and the pH Controller 58, each controller includes an associated calibration relay (not shown) which is arranged to be activated by the system computer. In this regard when the system computer activates the calibration relays all of the probes associated with the controllers are electrically isolated therefrom and known signals are introduced into the electronics of the controllers to simulate probe-sensed conditions. These known signals should elicit a predetermined response from the controllers to indicate proper system calibration. If not, the system computer 62 senses the fact that the system is not calibrated and provides a warning signal to plant or operating personnel.

While not shown in the drawing FIGS. 1(A) or 1(B) the system 20 can include a conventional "biomass detector". As is known such a detector is a device which measures a pressure deferential through a pipe at a known flow rate to predict a build up of biological material. Such a dectector is connected to the Data Acquisition Interface Unit 60 to provide signals to the system computer for effecting control of the biocide pump 152 on an "as-needed" basis. Further still a corrosivity meter can be incorporated into the system and connected to the Data Acquisition Unit 60 to monitor corrosion rates.

As will be appreciated by those skilled in the art by introducing concentrated chemicals into the small diameter low flow rate header 54, the conductivity readings sensed by the probes are substantially higher than conductivity readings taken in the main water header. This factor ensures great accuracy in the system.

The calculations to determine how long the chemical feed pumps remain on to replace the chemicals lost during the blow-down process is accomplished in the computer 62 as follows: It is known that for any given water treatment chemical at a particular treatment concentration (parts per million) will produce a predetermined conductivity, e.g., a conductivity of 100 micromhos at a total treatment concentration of 800 parts per million. This data is stored in a look-up table in the computer's memory. A look-up table for each chemical to be introduced into the system is also stored in the computer's memory. By dividing the conductivity at the treatment concentration by the conductivity at which blow-down is to occur, the percentage concentration of the chemical at blow-down is determined. During blow-down a predetermined amount of conductivity is lost (e.g., blow-down is set to occur at 1500 micromhos and to stop at 1400 micromhos). This lost conductivity at blow-down is multiplied by the percentage concentration of the Chemical in the water at blow-down to provide the amount of conductivity or treatment concentration lost during blow-down. Based on the known cooling tower system volume and the amount of conductivity imparted due to evaporation (which data is stored within the computer), the computer calculates the exact poundage of chemicals lost during the blow-down process. At the end of blow-down the valves 102 and 168 are closed and valves 106 and 170 are open, whereupon make-up water flows through the chemical feed header. The computer then takes a reading of the conductivity of the make-up water via the signals provided from probes 116 and 162 via the controller 56. The chemical feed pump is then turned on and the time that it is turned on recorded. A known flow rate is established through the header 54 and is also recorded by the computer. The chemicals injected into the flow are uniformly mixed in the mixing chamber 160. The probe 162 measures the conductivity of the liquid exiting the chamber 160. When this conductivity reaches a steady state the computer records the steady state conductivity. The change in conductivity, that is the difference between the steady state conductivity and the conductivity of the make-up water, is then multiplied by the ratio of the treatment concentration to the conductivity for the particular chemical being introduced (which as noted earlier is stored within the computer in the look-up table). The computer then multiplies the change in conductivity by the ratio of the chemical concentration to its conductivity to provide the chemical concentration value. This later value is then converted by the appropriate scaling factor (also stored within the computer) to convert the concentration in parts per million to pounds of chemical per thousand gallons of water. The resulting value is then multiplied by the flow rate in gallons per minute and divided by 1,000 to provide the value of pounds of chemicals added per minute. With the pounds of chemicals added per minute by the system known, the computer then calculates the number of minutes the pump must stay on to replace the amount of chemicals lost. To that end the value of pounds per minute chemical added to the system by the pump is divided into the pounds of chemicals lost during blow-down to provide the time (in minutes) that the pump is to operate. When the computer determines that the pump has been on for the calculated period of time, a signal is provided from the computer to the unit 60 and the controller 56 and from there to the pump to shut the pump off.

It should be noted that in the above described operation the computer provides a signal via the unit 60 to close valve 170 and a to open valve 168 upon the attainment of a steady state conductivity reading by probe 162. By such action the system 20 insures that the chemicals introduced into the system are not wasted (drained).

It must also be pointed out that the amount of chemical lost during blow-down can be calculated in an alternative manner by the computer. In this regard the computer monitors the rate of the liquids through the auto bleed valve 42 via signals provided from meter 48. The computer also monitors the time that it takes for the blow-down operation. Thus, with the known flow rate during blow-down, the known time during which blow-down occurs, and the concentration of chemicals in the water at blowdown, the computer calculates the pounds of chemicals lost during blow-down.

Referring now to FIG. 2 the structure of mixing device 160 is shown and will now be described. Thus, the mixing device 160 basically comprises a housing or a shell 222 forming in its interior a liquid receiving chamber 224. The chamber includes an inlet 226 through which the two fluids, e.g., liquids, to be mixed are introduced. Coupled to the inlet and within the chamber 224 is flow diverting conduit means 228. The conduit means 228 extends into a mixing cavity 230 which is also located within the chamber 224 and is formed by a cylindrical sidewall. The upper end of the mixing cavity 230 is open at 232 is thus in fluid communication with the interior of the chamber 224.

The flow diverting conduit is arranged to carry the liquids introduced into the device 160 through it and into mixing cavity 230. The conduit means 228 includes plural apertures 236 along a substantial length of the conduit means. The apertures 236 are equadistantly spaced in the longitudinal direction along the conduit 228. Each aperture extends at an angle of approximately 90° to the immediately adjacent aperture. Thus, the lower-most aperture is directed in one direction while the next higher aperture is directed at an angle 90° to the lower most aperture, and so forth and so on up the conduit. Each angularly directed aperture causes the exiting liquid stream to form a swirling or eddy current stream within a volumetric zone contiguous with the aperture from which the stream exits. Moreover, since the liquid in each zone is directed in the opposite direction as in its immediately adjacent zone, a swirling or eddy current action results at the interface of immediately adjacent zones. The foregoing actions create turbulence in the liquids in the mixing cavity, thereby expediting the mixing process and the interspersion of the liquids within the cavity. The mixed liquids overflow the cavity 230 out of its open end 232 and into chamber 224 and begin a laminar-like flow therein towards outlet 242 to complete the mixing of the liquids. The outlet 242 is connected to pipe 100 and through which the mixed liquids pass from the device 160 back to the system.

In accordance with the preferred embodiment of the mixing device it includes eductor means 270 for introducing gas, e.g., air, bubbles in the conduit 228. The air bubbles (not shown) create additional turbulence within the cavity 230, thereby providing an additional mixing action. The air bubbles are vented from the device 160 via vent means 272.

The eductor is of conventional construction and hence details of the eductor 270 need not be described herein. Suffice it to say that the eductor 270 is in the form of a venturi orifice (not shown) disposed in the inlet conduit of the mixing device and through which the liquids to be mixed pass. A gas input line 276 is located downstream of the venturi throat and in communication with inlet line 226. A valve 278 is provided in line 276 to control the flow of air therethrough.

The air vent 272 is also of conventional construction and thus the details thereof need not be described herein. Suffice it to state that the air vent 272 is connected in a vent line 280 downstream of a valve 282. The vent line 280 is in communication with the interior of chamber 224 so that air bubbles rising to the top of the mixing device flow out of the device through line 280.

As should be appreciated from the foregoing the system 20 provides various advantages over prior art systems. For example any inadvertent changes made by the operator to the chemical feed pump rate is automatically sensed by the computer. The computer then overrides such action and controls the pump to stay on for the required time to replace the chemicals lost. Furthermore, if there is a malfunction in the chemical feed pump or if the chemical runs out because of low tank or drum level, the conductivity probe 162 senses the reduction in conductivity due to the lack of chemicals. The computer thus responds to this reduction in conductivity by providing an alarm signal indicating the inability to maintain chemical feed. Further still if the chemical feed pump is too low an automatic alarm is provided by the computer. In this regard during the time that the pump is on the computer it takes periodic readings of the conductivity downstream of the point of chemical injection (at probe 162) to verify that a continuous feed rate is being maintained.

As should be appreciated from the foregoing the system 20, separate and apart from its computer-controlled aspects, utilizes a technique and apparatus to enable one to accurately mix any two or more fluids (liquids or gas) based upon any sensed parameter, e.g., conductivity, which has a definable relationship to concentration. Thus, the teachings of the subject invention can be used in applications other than water treatment. For example the teachings of this invention can be utilized in the dyeing industry to accurately mix desired dye shades from plural liquid dyes in response to sensed conductivity based on the relationship of the concentration of the dyes to their respective conductivities.

Without further elaboration the foregoing will so fully illustrate my invention that others may, by applying current or future knowledge, readily adapt the same for use under various conditions of service.

I claim:

1. In a system having a main line carrying a first fluid therethrough, control means, and means for selectively introducing a second fluid into said main line comprising a second line of a lower flow rate than said main line and arranged to receive a reference fluid therethrough, said second line being connected in shunt with said main line and arranged to selectively receive a portion of said first fluid therethrough, said reference fluid having known parameters, one of which being the flow rate through said second line, said second line including injecting means for introducing said second fluid therein and for uniformly mixing said second fluid with any fluid flowing therethrough, said second line including first sensing means located upstream of said injecting means for measuring a first predetermined parameter of any fluid flowing thereby, said first parameter not being the flow rate through said second line, and second sensing means located downstream of said injecting means for measuring said first parameter of any fluid flowing thereby, said control means being coupled to said injecting means and said first and second sensing means for determining the concentration of said second fluid flowing through said second line for introduction into said main line based on the difference between said first parameter as measured by said first and second sensing means, and for controlling the introduction of said second fluid into said second line as a function of said flow rate through said second line and the determined concentration of said second fluid.

2. The system of claim 1 wherein said reference fluid is a different fluid than either of said first and second fluids and wherein said system additionally comprises selector means for selectively preventing any portion of said first fluid from flowing through said second line while allowing said reference fluid to flow therethrough during one period of time and for allowing a portion of said first fluid to flow through said second line while preventing said reference fluid to flow therethrough during another period of time.

3. The system of claim 2 wherein said steady state parameter is conductivity.

4. The system of claim 3 wherein said fluids are liquids and wherein said injection means comprises pump means and a mixing device, said pump means for providing said second fluid to said mixing device, said mixing device also receiving the fluid flowing through said second line to mix said fluids into a homogenous mixture for continued passage in said second line.

5. The system of claim 2 wherein said system comprises a water treatment system, where said fluids are liquids and wherein said selector means comprise valve means and wherein said valve means are arranged to selectively prevent fluid flowing through said second line from entering said main line while allowing said fluid to flow out of said second line.

6. The system of claim 5 wherein said control means comprises computer means.

7. The system of claim 6 wherein said first parameter is conductivity and wherein said computer means has stored therein data correlating the conductivity of said second fluid to its concentration at various levels.

8. The system of claim 7 wherein said injection means comprises pump means and computer means, the amount of the second fluid to be introduced into the system is predetermined and wherein said computer means controls the length of time said pump means operates to introduce said predetermined amount of fluid into said second line.

9. The system of claim 1 wherein said reference fluid is a portion of said first fluid.

10. The system of claim 9 wherein said first parameter is conductivity.

11. The system of claim 10 wherein said fluids are liquids and wherein said injection means comprises pump means and a mixing device, said pump means providing said second fluid to said mixing device, said mixing device also receiving the fluid flowing through said second line to mix said fluid into a homogenous mixture for continued passage in said second line.

12. The system of claim 1 wherein said first parameter is conductivity.

13. The system of claim 1 wherein said fluids are liquids and wherein said injection means comprises pump means and a mixing device, said pump means providing said second fluid to said mixing device, said mixing device also receiving the fluid flowing through said second line to mix said fluids into a homogeneous mixture for continued passage in said second line.

14. The system of claim 13 wherein said mixing device consists of a mixing chamber.

15. The system of claim 1 wherein said control means comprises computer means.

16. The system of claim 15 wherein said first parameter is conductivity and wherein said computer means has stored therein data correlating the conductivity of said second fluid to its concentration at various levels.

17. The system of claim 16 wherein said fluids are liquids and wherein said injection means comprises pump means and computer means, the amount of the second fluid to be introduced into the system is predetermined and wherein said computer means controls the length of time said pump means operates to introduce said predetermined amount of fluid into said second line.

18. The system of claim 17 wherein said injection means also comprises a mixing device, said mixing device mixing the fluid flowing through said second line with the second fluid to form a homogeneous mixture.

19. The system of claim 1 wherein said first fluid comprises water and said second fluid comprises a water treatment liquid.

20. The system of claim 19 wherein said reference fluid comprises make-up water.

21. The system of claim 20 wherein said first parameter comprises conductivity.

22. The system of claim 19 wherein said reference fluid comprises a portion of the water flowing through said main line.

23. The system of claim 22 wherein said first parameter comprises conductivity.

24. The system of claim 1 wherein said first parameter is conductivity.

25. The method of accurately mixing a predetermined amount of a second fluid with a first fluid, said first fluid flowing through a main line, comprising the steps of providing a second line in shunt with said main line, said second line being arranged to be selectively connected to said main line to allow fluid to flow therebetween, said second line having a lower flow rate than said main line, providing a reference fluid through said second line, said reference fluid having known parameters, one of which being the flow rate through said second line, measuring a first predetermined parameter of any fluid flowing through said second line at a first point, said first parameter not being the flow rate through said second line, injecting said second fluid into said second line downstream of said first point and homogeneously mixing said fluids, measuring said first predetermined parameter of said homogeneous mixture of fluids in said second line at a second point downstream of said first point and determining when said predetermined amount of said second fluid has been injected into said second line based on the difference between said measured first parameters and as a function of said flow rate through said second line, and stopping the injection of said second fluid into said second line at that time.

26. The method of claim 25 wherein said first parameter is conductivity.

27. The method of claim 26 wherein said reference fluid is a different fluid than either of said first and second fluids.

28. The method of claim 26 wherein said reference fluid comprises a portion of said first fluid.

29. The method of claim 25 wherein said fluids are liquids.

* * * * *